March 4, 1952     W. C. POTTHOFF     2,587,891
MAGNETIC PULLEY

Filed Nov. 18, 1946     2 SHEETS—SHEET 1

INVENTOR.
BY WILLIAM C. POTTHOFF
Oldham & Oldham
ATTORNEYS

March 4, 1952 W. C. POTTHOFF 2,587,891
MAGNETIC PULLEY
Filed Nov. 18, 1946 2 SHEETS—SHEET 2
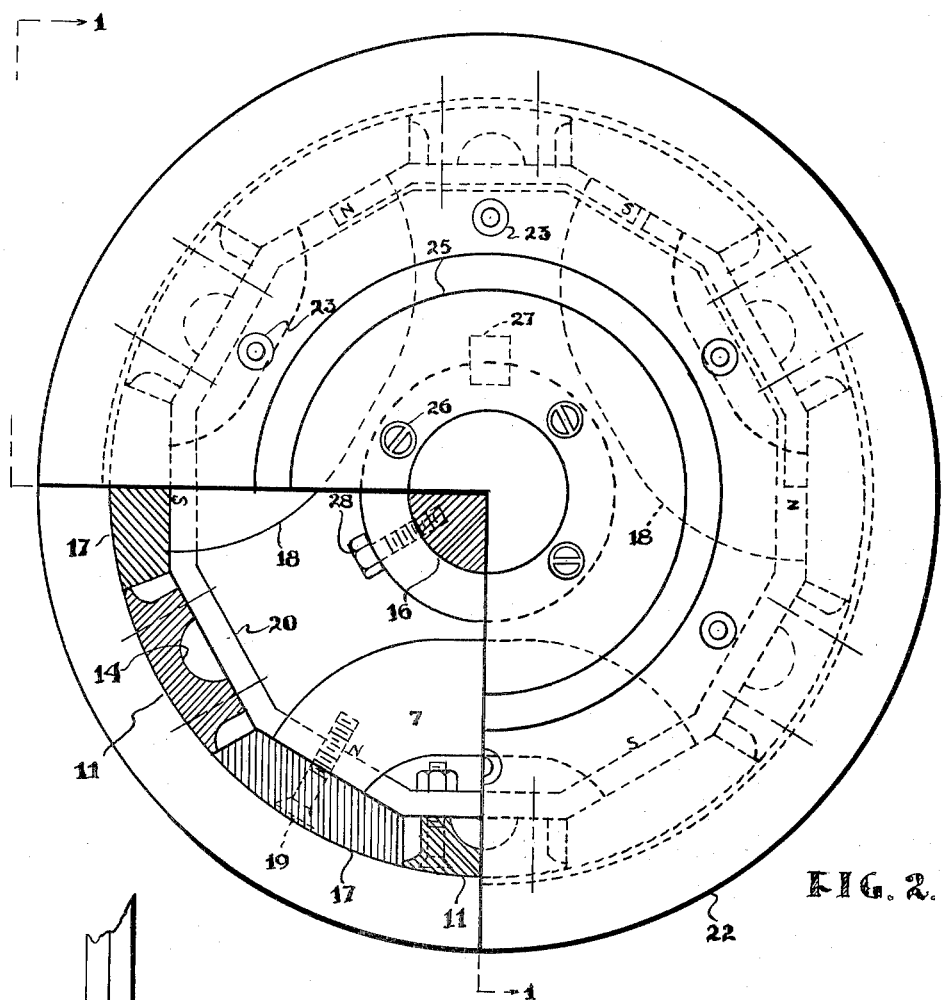
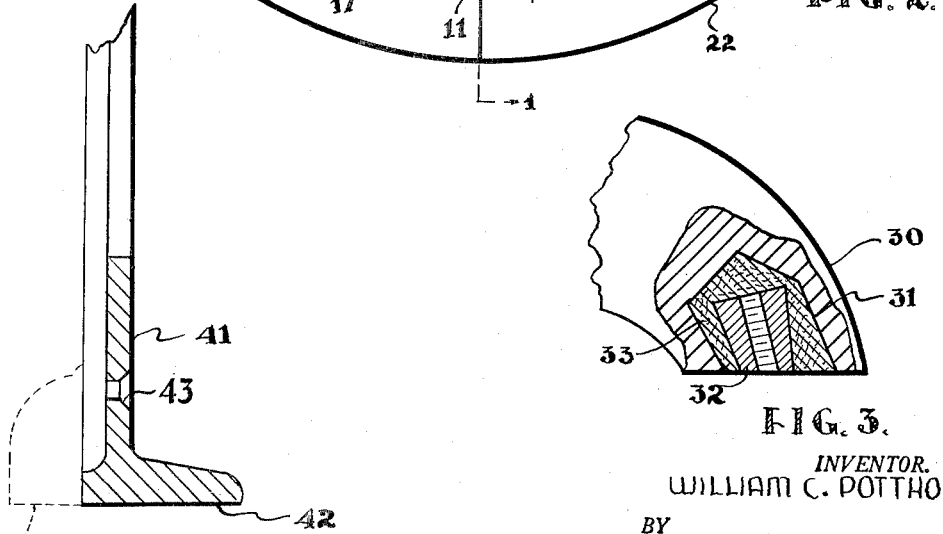
INVENTOR.
WILLIAM C. POTTHOFF
BY Oldham & Oldham
ATTORNEYS Patented Mar. 4, 1952

2,587,891

UNITED STATES PATENT OFFICE 2,587,891

MAGNETIC PULLEY

William C. Potthoff, Cuyahoga Falls, Ohio, assignor to Eriez Manufacturing Co., Erie, Pa., a corporation of Pennsylvania Application November 18, 1946, Serial No. 710,587

1 Claim. (Cl. 209—219)

This invention relates to magnetic pulleys or roll type separators, particularly to means of that type that use permanent magnets for their attracting and holding power.

Heretofore, many types of magnetic pulleys have been provided for a variety of uses but substantially all of such pulleys have been powered by electro-magnets. In many instances, electro-magnets are unsuitable due to the difficulties in providing direct current power for their operation, which power may require a motor generator or a rectifier circuit in conjunction with the pulley. Then too, such circuits have relatively high operational and maintenance costs and are difficult to insulate. The D. C. energization current for electro-magnets also presents a fire hazard due to the arcing and sparking of such current in going through contacts and switches and such magnets decrease in efficiency, as their temperatures rise due to either external or internal causes. Furthermore, some materials, such as certain plastics, are deleteriously affected by heat so that they cannot be used in association with electro-magnetic pulleys in many instances. Several types of permanent magnet type magnetic pulleys have been proposed in the past but such magnets have not provided the desired strength magnetic field, or have been too costly.

The general object of this invention is to avoid the foregoing and other disadvantages of and objections to known types of magnetic pulleys and to provide a permanent magnet powered pulley or separator which has a strong attracting and holding field that is of substantially uniform strength over the length of a relatively large pulley.

Another object of the invention is to provide a magnetic pulley with a plurality of circumferentially spaced permanent magnets adapted to provide a maximum efficiency of action.

Another object of the invention is to provide a low installation cost, low weight, reliable magnetic pulley of sturdy construction.

A further object of the invention is to provide a magnetic pulley having low operation and maintenance costs but which is of substantially constant strength for an extended period.

Another object of the invention is to provide a magnetic pulley which has uniform fields therein at local portions thereof.

Yet another object of the invention is to provide a pulley or separator roll of such construction or assembly as to be easily and inexpensively magnetized.

The foregoing, and other objects and advantages of the invention, which will be made apparent as the specification proceeds, are achieved by the provision of a magnetic pulley comprising, generally speaking, a drum member including end discs and circumferentially spaced, longitudinally extending spacer bars, and longitudinally extending magnetic-conductive bars secured to the drum member and being positioned between the spacer bars; and a plurality of circumferentially extending permanent magnets removably secured at their ends to the magnetic-conductive bars with circumferentially adjacent poles being of opposite charge.

Reference now is made to the accompanying drawings, wherein:

Fig. 2 is a transverse section, partly in elevation, taken on line 2—2 of Fig. 1;

Fig. 3 is an elevation, partly in section, of a modification of a magnet of the invention; and Fig. 4 is a vertical section of a modified belt retainer disc of the invention.

Figure 1:
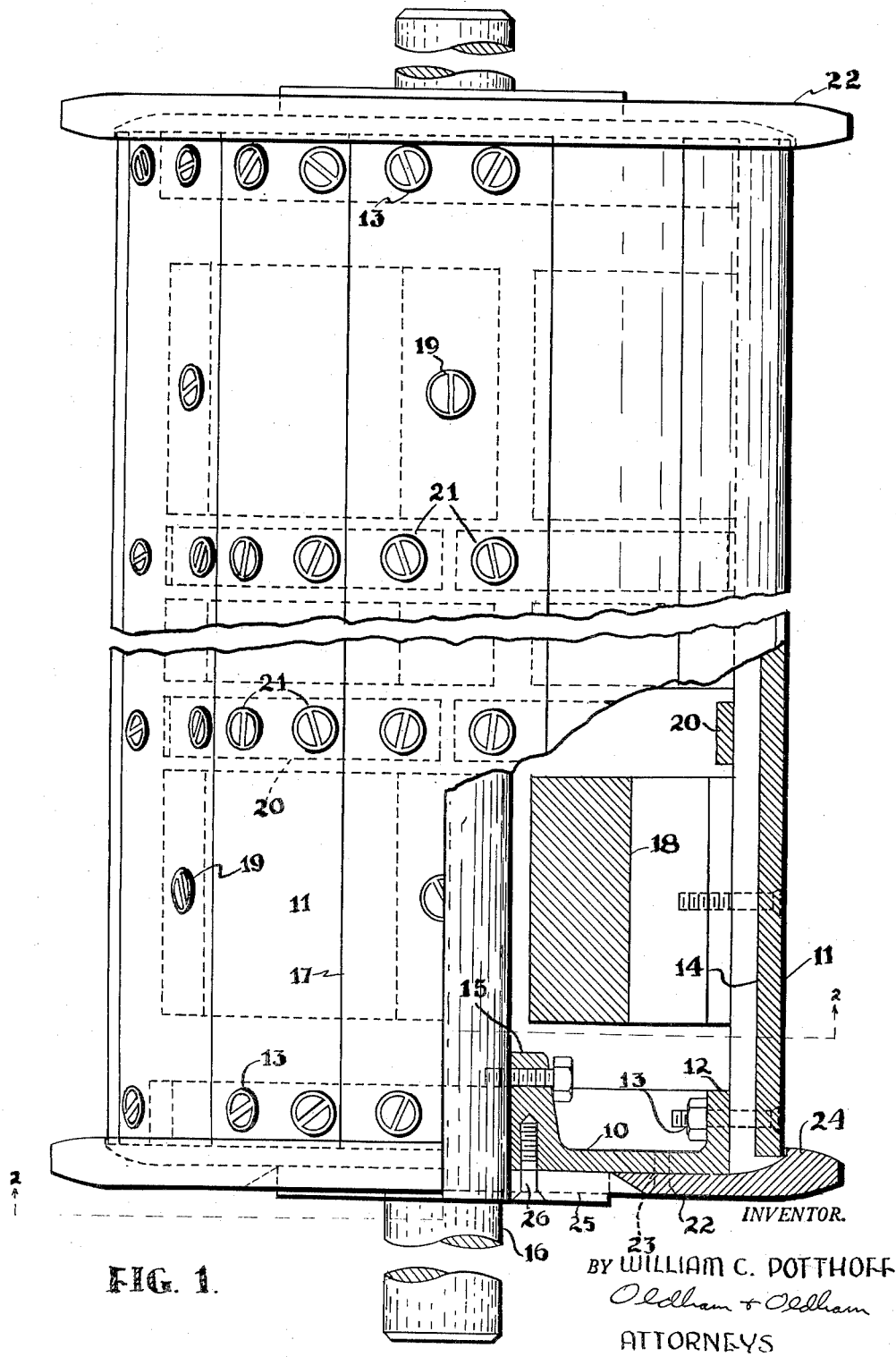
Fig. 1 is longitudinal section, partly in elevation, taken on line 1—1 of Fig. 2 of a magnetic pulley embodying the principles of my invention.

Referring in detail to the pulley of the invention, a pair of disc-like end members 10 are shown which have a plurality of uniformly circumferentially-spaced longitudinally-extending spacer bars 11, secured to inwardly directed flanges 12 of the end members by bolts 13. The spacer bars 11, and the ends 10 are made from a suitable non-magnetic material, such as aluminum, and the bars 11 may be recessed on their inner surfaces at 14 to reduce their weight and cost. The ends 10 may have apertured center bosses 15 through which a mounting shaft 16 extends. Then to render the field and strength of the pulley uniform over its length, as will be hereinafter explained, a plurality of steel bars 17 are secured to and extend between the flanges 12 of the ends 10 in uniformly spaced circumferential positions so as to close the gaps between the spacer bars 11 and form a drum therewith.

A primary feature of the invention is the use of three relatively wide, broadly curved permanent magnets 18 around the circumference of the pulley to energize same. The poles or ends of the magnets 18 are secured by screws 19 to the bars 17 with the individual magnets bridging over a spacer bar 11. The magnets 18 are arranged to form, in effect, annular sections in the pulley and I prefer to provide a plurality of such annular sectional arrangements of the magnets spaced transversely along the pulley without, of course, interfering with or changing the integral construction of the pulley. Fig. 2 brings out that the adjacent poles of the magnets 18 are oppositely charged and also that the poles are evenly spaced around the circumference of the pulley. Of course, similar magnets of the pulley in different lateral portions thereof are similarly positioned and bridge over the same spacer bars 11. A surprising element of the pulley of the invention is that a large amount of what otherwise would be the stray magnetic lines, or leakage of the magnets, is put to use by the special shapes and spacing of the magnets. Taking a reading of the strength of the field one-half way between the poles of the magnets to be 100, by assembling them as disclosed herein, a field with a measurement of 75 is obtained between the poles of a given magnet and a field with a strength of 75 is likewise obtained between the adjacent poles of adjacent magnets, or a total useful field of 150 is obtained where a field of only 100 existed before.

The fields set up around the pulley, due to the special shapes and numbers of magnets used, define strong attracting forces while combining therewith good holding power. Or, in other words, the fields of the pulley extend out from its surface several inches while they also follow closely around its surface. In this connection, the bars 11 are not only spacer bars but they also form insulator bars in one sense since aluminum, or other non-magnetic material from which they are made, has a low premeability. Use of three magnets of the wide, shallow type, as shown, or even substantially straight magnets, avoids excessive leakage of the magnet's field from it between its poles. Also, the chordal relationship of the magnet's poles permits only a minimum field loss due to its path being in a straight line through a spacer bar (and inside the periphery of the pulley) from one pole to another.

In order to reenforce the pulley on some wide models thereof, a plurality of hoop bars 20 are secured to and bridge between the spacer bars 11 and the steel bars 17 on the radially inner surfaces thereof. The bars 20 are secured in place by screws 21 that extend through the bars 11 and 17 from the outer surface thereof to position the hoop bars 20. Ordinarily, the bars end at the middle of the bars 17 with one bar 20 bridging over one spacer bar and being secured to the adjacent steel bars. A plurality of the bars 20 are positioned in slightly circumferentially spaced end to end relation to form a reenforcing hoop intermediate the end members 10. A plurality of such hoops may be formed in the pulley, being spaced laterally thereof intermediate the annular sections formed by the magnets. The hoop bars 20 preferably are formed of a non-magnetic material, such as aluminum. In some instances, it may even be desirable to use a reenforcing disc of suitable construction in place of the hoop bars 20.

The magnetic pulley is provided with non-magnetic discs 22 that are secured to and extend radially beyond the end members 10 by screws 23. The discs 22 serve to retain the pulley in engagement with a belt passing therearound and they have inwardly directed flanges 24 formed at their radially outer portions. Such flanges 24 fit over the ends of the spacer bars 11 and steel equalizer bars 17. Annular thrust bearings 25 may be secured to the outer surfaces of the end members 10, if desired, by screws 26.

A further feature of the invention is found in the method of assembly and magnetization of the pulley of the invention so that the desired uniform field is obtained. To this end, the magnets, which are made from a conventional magnetizable material adapted to retain its magnetization, such as one of the "Alnico" alloys, which alloys comprise aluminum, nickel, cobalt and iron, are assembled in pulley sections prior to their complete magnetization. "Alnico," has, for example, been found to provide good magnetic action without being of excess cost. These magnets are first magnetized by being exposed to a high strength electric field and then they are secured to the steel bars 17 and again exposed to a suitable high strength field in order to produce the desired polarity and field strength in the magnets and their associated means. It seems that the magnets 18 lose a portion of their charge when they are attached to the bars 17 but this charge is replaced and the bars are likewise charged by the exposure of the subassembly to the magnetic field. These bars 17 retain their charge, which is distributed uniformly along their length, as long as they are secured to the magnets 18.

The pulley of the invention may be secured to the shaft 16 by a key 27 that engages with one of the bosses 15 of an end 10. Screws 28 also may extend radially through the bosses 15 to aid in securing the pulley to the shaft.

From the foregoing, it will be seen that a compact, strongly-constructed magnetic pulley has been provided by the invention. The pulley will retain its energization over a long period of time and hence will require little or no maintenance and will entail no operating costs for enegization current. The pulley can be journalled in any conventional bearings or housings and ordinarily it will be used with a belt extending around it and on which the material to be separated will be carried. However, it is possible to use the pulleys as a separator roll placed above the material to be cleaned or separated, or the pulley might even have the material passing directly over its surface. Fig. 2 brings out that the radially outer surfaces of the spacer and steel bars are arcuate and that they blend to define a circle. This figure also shows that the magnets are so formed and positioned as to leave the center of the pulley open for a mounting shaft.

Fig. 3 shows a modified type of anchoring means for the permanent magnets of the pulley which may be desirable in some instances. A magnet 30 is provided with a cord out hole 31 which has a tapped steel or other suitable metal sleeve 32 positioned therein for engagement with a screw to secure the magnet in position. Lead or other filler metal 33 is placed around the sleeve 32 to secure it to the magnet. Fig. 3 shows that the base of the sleeve 32 is larger than the top of the sleeve to aid in retaining it in engagement with the magnet.

Fig. 4 shows a modification of the tapered pulley retaining disc 22 wherein a disc 41 is provided for use in place of the disc 22. The disc 41 has an axially outwardly overhanging flange 42 which tapers radially inwardly, as shown, to retain any belt around the pulley in association with it. Holes 43 are provided in the disc 41 to receive securing means for positioning the disc on a pulley, which disc is so positioned that the laterally inner corner of the outer surface of the flange is flush with the pulley P, as indicated in Fig. 4.

While I have shown and described in detail several embodiments of my invention, it will be realized that I am not limited thereto or thereby and that the scope of the invention is defined solely by the appended claim.

I claim:

A magnetic pulley comprising a shaft, a pair of spaced non-magnetic end members secured to the shaft, a plurality of bars secured to and extending between the end members, said bars being circumferentially spaced and abutting along the longitudinal edges thereof in side-by-side relationship, the outer surface of said bars providing a continuous cylindrical surface extending between the end members, said bars being alternately of magnetic and non-magnetic material, a plurality of permanent magnets, opposite poles of the magnets being secured to the inner surfaces of the bars of magnetic material in circumferentially spaced relationship whereby alternate magnetic bars are of opposite magnetic polarity, and non-magnetic reinforcing bars secured to and extending between adjacent bars on the inner surfaces thereof, said reinforcing bars providing a hoop-like structure tying the bars together intermediate the end members.

WILLIAM C. POTTHOFF.

REFERENCES CITED

The following references are of record in the file of this patent:

UNITED STATES PATENTS

| Number | Name | Date |
|---|---|---|
| 69,128 | Righter | Sept. 24, 1867 |
| 148,517 | Smith | Mar. 10, 1874 |
| 336,402 | Fisher | Feb. 16, 1886 |
| 446,767 | Buchanan | Feb. 17, 1891 |
| 451,370 | Conkling | Apr. 28, 1891 |
| 1,243,697 | Bram | Oct. 23, 1917 |
| 1,484,619 | Blake | Feb. 26, 1924 |
| 1,685,498 | McCullough | Sept. 25, 1928 |
| 2,188,091 | Baerman | Jan. 23, 1940 |
| 2,222,768 | Gruender | Nov. 26, 1940 |
| 2,466,839 | Caldwell | Apr. 12, 1949 |

FOREIGN PATENTS

| Number | Country | Date |
|---|---|---|
| 401,301 | Great Britain | Nov. 6, 1933 |
| 607 | Great Britain | of 1880 |

OTHER REFERENCES

Catalogue of Barnes Drill Co. of Rockford, Illinois, designated Bulletin 151A, "Coolant Separators for Honing and Grinding Machines," published in 1944, February 23, 1945.